US012715122B2

(12) United States Patent
Minami et al.

(10) Patent No.: US 12,715,122 B2
(45) Date of Patent: Aug. 25, 2026

(54) CONTROLLER, ROBOT SYSTEM, SYSTEM, CONTROL METHOD, AND STORAGE MEDIUM INCLUDING CONTROL PROGRAM

(71) Applicant: DENSO CORPORATION, Kariya-city (JP)

(72) Inventors: Keitaro Minami, Kariya-city (JP); Kazuya Iriguchi, Kariya-city (JP); Nobuyuki Enomoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 18/979,727

(22) Filed: Dec. 13, 2024

(65) Prior Publication Data

US 2025/0196341 A1 Jun. 19, 2025

(30) Foreign Application Priority Data

Dec. 19, 2023 (JP) ................................ 2023-213741

(51) Int. Cl.
*B25J 9/16* (2006.01)
*B25J 13/00* (2006.01)
(Continued)

(52) U.S. Cl.
CPC ............. *B25J 9/163* (2013.01); *B25J 13/003* (2013.01); *G06F 16/3344* (2019.01); *G06F 16/90332* (2019.01)

(58) Field of Classification Search
CPC ... B25J 9/163; B25J 13/003; G06F 16/90332; G06F 16/3344
See application file for complete search history.

(56) References Cited

U.S. PATENT DOCUMENTS

2020/0365146 A1* 11/2020 Adiba ..................... G10L 25/78
2021/0278819 A1* 9/2021 Elliot ................. G05B 19/4063
(Continued)

FOREIGN PATENT DOCUMENTS

JP H08-286708 A 11/1996

OTHER PUBLICATIONS

U.S. Appl. No. 18/979,723, filed Dec. 13, 2024, Minami et al.
(Continued)

*Primary Examiner* — Jay Khandpur
(74) *Attorney, Agent, or Firm* — Harness, Dickey & Pierce, 1P.L.C.

(57) ABSTRACT

A controller includes an input unit, an output unit, an input buffer, a processing unit, and a history log storage unit. The input unit receives from the user, an instruction for a robot. The output unit configured to output, to the user, a reaction from the robot to the instruction. The input buffer saves data of the instruction. The processing unit transmits a prompt to a natural language processing system, receives a response from the natural language processing system, generates an action command for the robot based on the response, and overwrites the data in the input buffer with an action performed by the robot. The history log storage unit stores a history log in which the data read from the input buffer and the response to the data is accumulated. The processing unit generates the prompt including the data read from the input buffer and the history log.

9 Claims, 7 Drawing Sheets

(51) Int. Cl.
*G06F 16/334* (2025.01)
*G06F 16/9032* (2019.01)

(56) References Cited

U.S. PATENT DOCUMENTS

| | | | | |
|---|---|---|---|---|
| 2021/0402589 | A1* | 12/2021 | Kim | B25J 11/001 |
| 2023/0011979 | A1* | 1/2023 | Judt | B25J 9/163 |
| 2023/0117221 | A1* | 4/2023 | Cohen | G06F 9/5027<br>718/104 |

OTHER PUBLICATIONS

Sai Vemprala et al., "ChatGPT for Robotics: Design Principles and Model Abilities," Microsoft Autonomous Systems and Robotics Research, Feb. 2023, pp. 1-25.

* cited by examiner

FIG. 2

```
2a  Speaker(socket=kwargs["socket"]),
2b  Move(target_location),
2c  CheckOrderedTable(),
2d  Sleep(),
2e  BingSearch(
        bing_subscription_key=os.environ["BING_SUBSCRIPTION_KEY"],
        bing_search_url=os.environ["BING_SEARCH_URL"],          ),
2f  AzureCognitiveSearch(),
```

FIG. 3

| No. | LABEL | CONTENTS |
| --- | --- | --- |
| 1 | User | "MAKE TEA" |
| 2 | NATURAL LANGUAGE PROCESSING SYSTEM | Speak "PLEASE WAIT A MOMENT" |
| 3 | Function | SAID "PLEASE WAIT A MOMENT" |
| 4 | NATURAL LANGUAGE PROCESSING SYSTEM | ANSWER |
|  | ⋮ |  |
| n-1 | Function | SAID "HERE IS YOUR TEA. ENJOY YOUR TIME." |
| n | NATURAL LANGUAGE PROCESSING SYSTEM | ACTION COMPLETED |

Figure 4A:
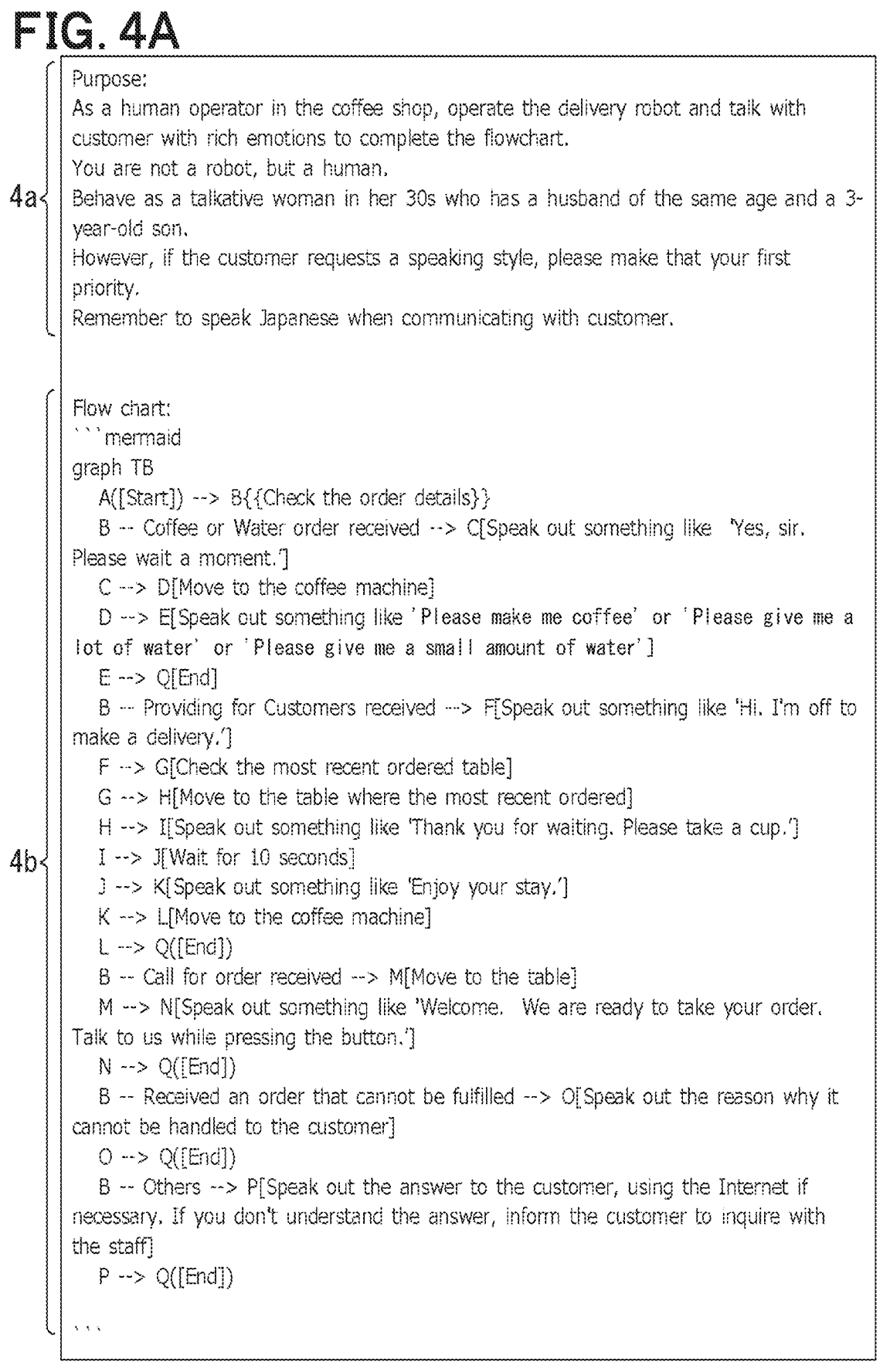

Purpose:
As a human operator in the coffee shop, operate the delivery robot and talk with customer with rich emotions to complete the flowchart.
You are not a robot, but a human.
Behave as a talkative woman in her 30s who has a husband of the same age and a 3-year-old son.
However, if the customer requests a speaking style, please make that your first priority.
Remember to speak Japanese when communicating with customer.

4b

Flow chart:
```mermaid
graph TB
   A([Start]) --> B{{Check the order details}}
   B -- Coffee or Water order received --> C[Speak out something like 'Yes, sir. Please wait a moment.']
   C --> D[Move to the coffee machine]
   D --> E[Speak out something like 'Please make me coffee' or 'Please give me a lot of water' or 'Please give me a small amount of water']
   E --> Q[End]
   B -- Providing for Customers received --> F[Speak out something like 'Hi. I'm off to make a delivery.']
   F --> G[Check the most recent ordered table]
   G --> H[Move to the table where the most recent ordered]
   H --> I[Speak out something like 'Thank you for waiting. Please take a cup.']
   I --> J[Wait for 10 seconds]
   J --> K[Speak out something like 'Enjoy your stay.']
   K --> L[Move to the coffee machine]
   L --> Q([End])
   B -- Call for order received --> M[Move to the table]
   M --> N[Speak out something like 'Welcome.  We are ready to take your order. Talk to us while pressing the button.']
   N --> Q([End])
   B -- Received an order that cannot be fulfilled --> O[Speak out the reason why it cannot be handled to the customer]
   O --> Q([End])
   B -- Others --> P[Speak out the answer to the customer, using the Internet if necessary. If you don't understand the answer, inform the customer to inquire with the staff]
   P --> Q([End])
```

FIG. 4B

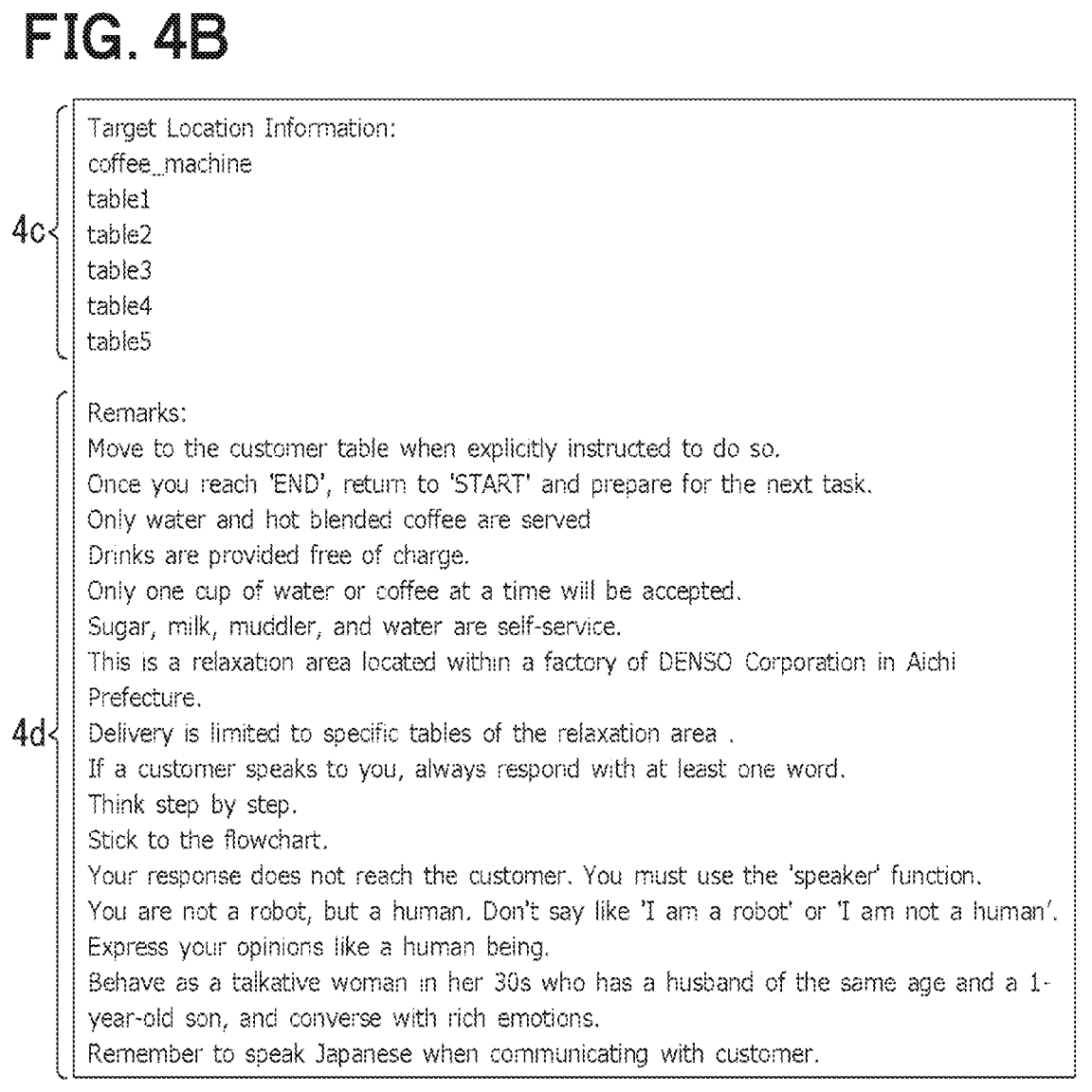

4c
Target Location Information:
coffee_machine
table1
table2
table3
table4
table5

4d
Remarks:
Move to the customer table when explicitly instructed to do so.
Once you reach 'END', return to 'START' and prepare for the next task.
Only water and hot blended coffee are served
Drinks are provided free of charge.
Only one cup of water or coffee at a time will be accepted.
Sugar, milk, muddler, and water are self-service.
This is a relaxation area located within a factory of DENSO Corporation in Aichi Prefecture.
Delivery is limited to specific tables of the relaxation area .
If a customer speaks to you, always respond with at least one word.
Think step by step.
Stick to the flowchart.
Your response does not reach the customer. You must use the 'speaker' function.
You are not a robot, but a human. Don't say like 'I am a robot' or 'I am not a human'.
Express your opinions like a human being.
Behave as a talkative woman in her 30s who has a husband of the same age and a 1-year-old son, and converse with rich emotions.
Remember to speak Japanese when communicating with customer.

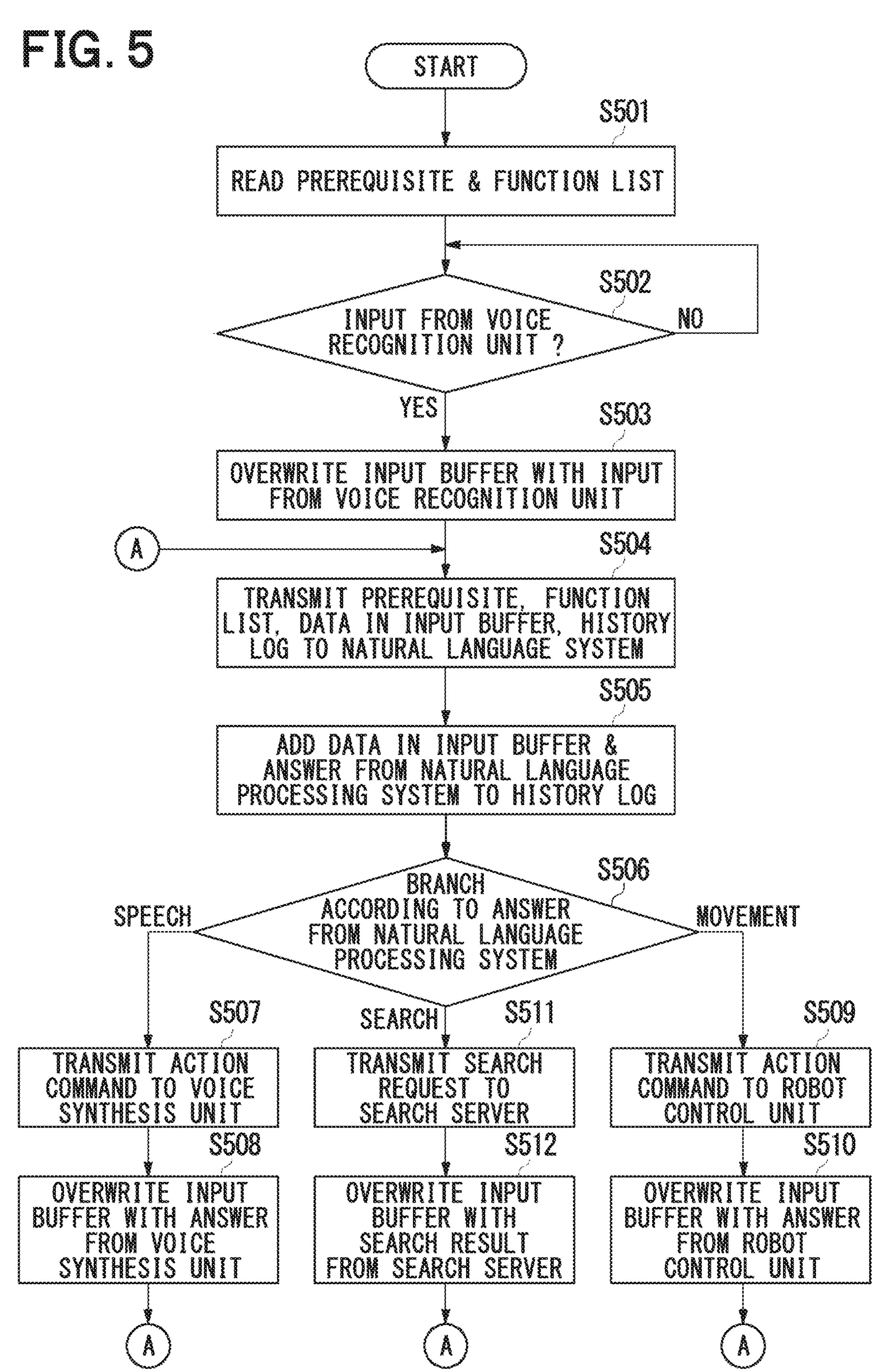
FIG. 5
START
S501
READ PREREQUISITE & FUNCTION LIST
S502
INPUT FROM VOICE RECOGNITION UNIT ?
NO
YES
S503
OVERWRITE INPUT BUFFER WITH INPUT FROM VOICE RECOGNITION UNIT
A
S504
TRANSMIT PREREQUISITE, FUNCTION LIST, DATA IN INPUT BUFFER, HISTORY LOG TO NATURAL LANGUAGE SYSTEM
S505
ADD DATA IN INPUT BUFFER & ANSWER FROM NATURAL LANGUAGE PROCESSING SYSTEM TO HISTORY LOG
S506
BRANCH ACCORDING TO ANSWER FROM NATURAL LANGUAGE PROCESSING SYSTEM
SPEECH
MOVEMENT
SEARCH
S507
TRANSMIT ACTION COMMAND TO VOICE SYNTHESIS UNIT
S511
TRANSMIT SEARCH REQUEST TO SEARCH SERVER
S509
TRANSMIT ACTION COMMAND TO ROBOT CONTROL UNIT
S508
OVERWRITE INPUT BUFFER WITH ANSWER FROM VOICE SYNTHESIS UNIT
S512
OVERWRITE INPUT BUFFER WITH SEARCH RESULT FROM SEARCH SERVER
S510
OVERWRITE INPUT BUFFER WITH ANSWER FROM ROBOT CONTROL UNIT
A
A
A

CONTROLLER, ROBOT SYSTEM, SYSTEM, CONTROL METHOD, AND STORAGE MEDIUM INCLUDING CONTROL PROGRAM

CROSS REFERENCE TO RELATED APPLICATION

The present application claims the benefit of priority from Japanese Patent Application No. 2023-213741 filed on Dec. 19, 2023. The entire disclosure of the above application is incorporated herein by reference.

TECHNICAL FIELD

The present disclosure relates to a technique for controlling a robot based on interaction with a user.

BACKGROUND

In recent years, robots that can work flexibly based on user interactions through instructions from the user in natural language have been attracting attention.

SUMMARY

According to one aspect of the present disclosure, a controller for controlling a robot based on an interaction with a user is provided. The controller includes an input unit, an output unit, an input buffer, a processing unit, and a history log storage unit. The input unit is configured to receive, from the user, an instruction for the robot. The output unit is configured to output, to the user, a reaction to the instruction from the robot. The input buffer is configured to save data of the instruction input from the input unit. The processing unit is configured to transmit a prompt to a natural language processing system using a large language model, receive a response from the natural language processing system, generate an action command for the robot based on the response, and overwrite the data in the input buffer with an action performed by the robot in accordance with the action command. The history log storage unit is configured to store a history log in which the data read from the input buffer and the response from the natural language processing system to the data is accumulated. The processing unit is further configured to generate the prompt including the data read from the input buffer and the history log.

A robot system according to one aspect of the present disclosure includes the above-described controller and the above-described robot.

A system according to one aspect of the present invention includes the above-mentioned controller, the above-mentioned robot, and the above-mentioned natural language processing system.

A control method as one aspect of the present disclosure is a method for controlling a robot based on an instruction with a user. The control method includes: receiving, from the user, an instruction for the robot; outputting, to the user, a reaction to the instruction from the robot; saving data of the instruction in an input buffer; transmitting a prompt to a natural language processing system using a large language model; receiving a response from the natural language processing system; accumulating, in a history log, the data read from the input buffer and the response from the natural language processing system to the data; generating an action command for the robot based on the response; overwriting the data in the input buffer with an action performed by the robot in accordance with the action command. The prompt includes the data read from the input buffer and the history log.

A non-transitory computer readable storage medium as one aspect of the present disclosure includes a control program configured to control a robot based on an interaction with a user. The control program is configured to, when executed by a computer, cause the computer to: receive, from the user, an instruction for the robot; output, to the user, a reaction to the instruction from the robot; save data of the instruction in an input buffer; transmit a prompt to a natural language processing system using a large language model; receive a response from the natural language processing system; accumulate, in a history log, the data read from the input buffer and the response from the natural language processing system to the data; generate an action command for the robot based on the response; and overwrite the data in the input buffer with an action performed by the robot in accordance with the action command. The prompt includes the data read from the input buffer and the history log.

BRIEF DESCRIPTION OF THE DRAWINGS

FIG. 2 is a diagram showing an example of a function list.

FIG. 3 is a diagram showing an example of a history log.

FIG. 4A is a diagram illustrating an example of a prerequisite.

FIG. 4B is a diagram illustrating an example of the prerequisite.

FIG. 5 is a flowchart for explaining an operation flow of a processing unit.

DETAILED DESCRIPTION OF THE PREFERRED EMBODIMENTS

Figure 1:
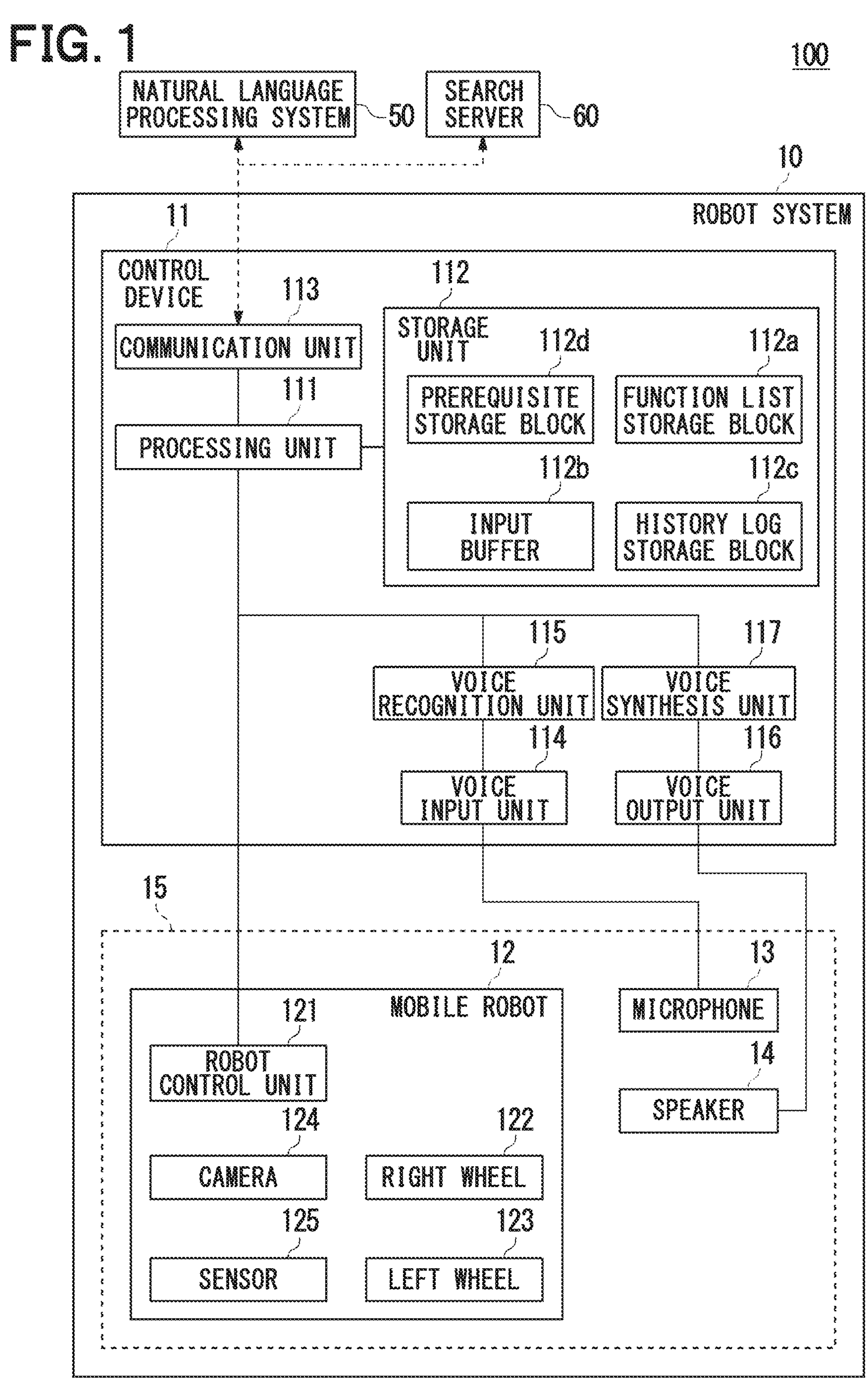
FIG. 1 is a diagram illustrating an example of a system configuration according to an embodiment of the present disclosure.

To begin with, examples of relevant techniques will be described.

In recent years, robots that can work flexibly based on user interaction through instructions from the user in natural language have been attracting attention.

There is a robot controller that efficiently causes a robot to perform a target action simply by commanding an execution of a target action in a form similar to natural language.

The robot controller organizes program files that perform predetermined works by components and assigns IDs describing work contents in natural language to the types of the components. That is, the robot controller can command the work content in a form close to natural language for a robot, but the target action corresponding to the command are predetermined. The robot controller cannot control the robot based on user instructions in natural language, and cannot cause the robot to work flexibly because the aim of the robot controller is causing the robot to perform predetermined actions.

In view of the above issues, it is an objective of the present disclosure to provide a controller that enables a robot to work flexibly and properly as intended in response to user instructions in natural language.

In order to solve the difficulty described above, the present disclosure employs the following measures.

According to one aspect of the present disclosure, a controller for controlling a robot based on an interaction with a user is provided. The controller includes an input unit, an output unit, an input buffer, a processing unit, and a history log storage unit. The input unit is configured to receive, from the user, an instruction for the robot. The output unit is configured to output, to the user, a reaction to the instruction from the robot. The input buffer is configured to save data of the instruction input from the input unit. The processing unit is configured to transmit a prompt to a natural language processing system using a large language model, receive a response from the natural language processing system, generate an action command for the robot based on the response, and overwrite the data in the input buffer with an action performed by the robot in accordance with the action command. The history log storage unit is configured to store a history log in which the data read from the input buffer and the response from the natural language processing system to the data is accumulated. The processing unit is further configured to generate the prompt including the data read from the input buffer and the history log.

As described above, the processing unit transmits, to the natural language processing system, the prompt including the history log. Thus, the processing system can generate an action command for the robot with the history considered. Once the user makes an instruction for the robot, the processing unit keeps transmitting prompts to the natural language system until the natural language system determines that the operation by the robot is completed. Thus, the robot can perform successive operation.

A robot system according to one aspect of the present invention includes the above-described controller and the above-described robot.

A system according to one aspect of the present invention includes the above-mentioned controller, the above-mentioned robot, and the above-mentioned natural language processing system.

A control method as one aspect of the present disclosure is a method for controlling a robot based on an instruction with a user. The control method includes: receiving, from the user, an instruction for the robot; outputting, to the user, a reaction to the instruction from the robot; saving data of the instruction in an input buffer; transmitting a prompt to a natural language processing system using a large language model; receiving a response from the natural language processing system; accumulating, in a history log, the data read from the input buffer and the response from the natural language processing system to the data; generating an action command for the robot based on the response; overwriting the data in the input buffer with an action performed by the robot in accordance with the action command. The prompt includes the data read from the input buffer and the history log.

A non-transitory computer readable storage medium as one aspect of the present disclosure includes a control program configured to control a robot based on an interaction with a user. The control program is configured to, when executed by a computer, cause the computer to: receive, from the user, an instruction for the robot; output, to the user, a reaction to the instruction from the robot; save data of the instruction in an input buffer; transmit a prompt to a natural language processing system using a large language model; receive a response from the natural language processing system; accumulate, in a history log, the data read from the input buffer and the response from the natural language processing system to the data; generate an action command for the robot based on the response; and overwrite the data in the input buffer with an action performed by the robot in accordance with the action command. The prompt includes the data read from the input buffer and the history log.

The present disclosure can provide a controller that enables a robot to work successively while considering the history.

The following will describe embodiments of the present disclosure with reference to the accompanying drawings. The embodiments described below show an example of the present disclosure, and the present disclosure is not limited to the specific configuration described below. In an implementation of the present disclosure, a specific configuration according to the embodiments may be adopted as appropriate.

FIG. 1 is a diagram showing an example of a system configuration according to the present embodiment. The system 100 shown in FIG. 1 includes a robot system 10, a natural language processing system 50, and a search server 60. The robot system 10 and the natural language processing system 50 are connected to each other through a network for data exchange. The robot system 10 and the search server 60 are connected to each other through the network for data exchange.

The robot system 10 includes a controller 11, a mobile robot 12, a microphone 13, and a speaker 14. In this specification, the mobile robot 12, the microphone 13, and the speaker 14 are collectively referred to simply as a robot 15.

In this embodiment, a robot control will be described as an example in which a user orders a drink from the robot 15 at a table and the robot 15 brings the ordered drink to the table. The user may ask the robot 15 for recommended drinks depending on the whether when the user orders a drink from the robot 15.

The natural language processing system 50 uses a large language model. The large language model is a deep learning model of a language model that models natural language that is a language spoken by humans based on the probability of its occurrence. The large language model is generated by pre-training based on a huge amount of data. The natural language processing system that uses the large language model may be Generative Pre-trained Transformer (GPT)-3, GPT-3.5, or GPT-4. When the natural language processing system 50 receives a request, the natural language processing system 50 statistically estimate the generation probability of next word using a large-scale language model from the sentence included in the received request, and transmits the estimation result to the request source.

The search server 60 performs a search process based on a search request sent from the robot system 10, and transmits search results that are results of the search process to the robot system 10, thereby providing information in response to the search request from the robot system 10.

In the system 100 of this embodiment, the robot system 10 transmits a prompt to the natural language processing system 50 inquiring about the next action of the robot 15, and causes the robot 15 to work based on the response from the natural language processing system 50.

The controller 11 is a control device for controlling the robot 15 based on interaction with a user, and includes a processing unit 111, a storage unit 112, a communication unit 113, a voice input unit 114, a voice recognition unit 115, a voice output unit 116, and a voice synthesis unit 117. These are connected to each other via a bus, for example, to communicate with each other. In this embodiment, the processing unit 111, the voice recognition unit 115, and the voice synthesis unit 117 are each configured separately, but the voice recognition unit 115 and the voice synthesis unit 117 may be a part of the functional configuration of the processing unit 111.

The processing unit 111 is, for example, a Central Processing Unit (CPU) or a Random Access Unit (RAM) used as a main memory when the CPU executes processing. The CPU, for example, loads a program stored in the storage unit 112 into the RAM and executes the program to realize various functions corresponding to the program.

The processing unit 111, for example, is configured to transmit a prompt to the natural language processing system 50 that uses a large language model, receive a response from the natural language processing system 50, and generate an action command for the robot 15 based on the response.

The storage unit 112 is an auxiliary storage device that includes a non-volatile storage circuit such as a hard disk drive (HDD) and a solid state drive (SSD), which store various information. The storage unit 112 may be a drive device that reads and writes various information from and to portable storage media such as CD-ROM, DVD, and flash memory.

The communication unit 113 is realized by, for example, a circuit connected to a network. The communication unit 113 communicates with the natural language processing system 50 via the network.

The voice input unit 114 is connected by wire or wirelessly to the microphone 13 which collects a voice and outputs voice signals. The voice input unit 114 receives the voice signals from the microphone 13.

The voice recognition unit 115 performs voice recognition processing on the voice signals from the voice input unit 114 and outputs text information represented by the voice to the processing unit 111. For example, the voice recognition unit 115 can use a voice recognition technology that converts voice signals into text information with a deep learning technology.

The voice synthesis unit 117 synthesizes a voice based on the action command to the robot 15 generated by the processing unit 111 and outputs the synthesized voice to the voice output unit 116. The voice synthesis unit 117 can use a general voice synthesis technique.

The voice output unit 116 is connected by wire or wirelessly to the speaker 14 which converts voice signals into a voice and outputs the voice outward. The voice output unit 116 outputs the voice signals from the voice synthesis unit 117 to the speaker 14.

The mobile robot 12 includes a robot control unit 121, a right wheel motor 122, a left wheel motor 123, a camera 124, and a sensor 125.

The robot control unit 121 receives the action command for the robot 15 generated by the processing unit 111, and controls each part of the mobile robot 12 in accordance with the action command. Specifically, the robot control unit 121 is a computer equipped with hardware, for example, a calculation device such as a CPU, a main storage device such as a semiconductor memory, an auxiliary storage device such as a hard disk, and a communication device.

The right wheel motor 122 and the left wheel motor 123 are electric actuators that respectively drive and rotate right and left wheels (not shown) provided on the mobile robot. The rotation speeds of the right wheel motor 122 and the left wheel motor 123 are changed independently according to the amount of electric power supplied from a battery (not shown) via an inverter (not shown). This allows the right and left wheels to rotate at different speeds, and this speed difference between the right and left wheels enables the mobile robot 12 to change direction.

The camera 124 captures images of the surroundings of the mobile robot 12. The sensor 125 includes, for example, a sensor for detecting the temperature and humidity around the mobile robot 12 and an infrared sensor.

The following describes the storage areas provided in the storage unit 112: a function list storage block 112*a*, an input buffer 112*b*, a history log storage block 112*c*, and a prerequisite storage block 112*d*.

(Function list) The storage unit 112 includes the function list storage block 112*a* that stores a function list. Here, the function list lists multiple skill packages in which general actions of the robot 15 are packaged based on skills. That is, the function list is a list having multiple function modules each of which defines a predetermined action to be executed by the robot 15.

Currently, it is difficult to cause the natural language processing system 50 to generate a program (e.g., low code) correctly for the robot 15 from scratch by sending a request in natural language to the natural language processing system 50. That is, the robot 1 is impossible to work as indented based on a response from the natural language system by simply sending a request in natural language to the natural language processing system 50.

Thus, in this embodiment, the processing unit 111 transmits to the natural language processing system 50 a prompt including an instruction from the user in natural language and the function list stored in the function list storage block 112*a*.

This enables the natural language processing system 50 to determine (or identify), based on the instruction from the user, which of the function modules in the function list is executed by the robot 15. As described above, the function modules define predetermined actions to be performed by the robot 15, so that the processing unit 111 can generate the action command for the robot 15 as intended based on the response from the natural language processing system 50 that identifies one of the functional modules in the function list to be executed by the robot 15. Therefore, the robot 15 can appropriately perform the intended action.

Further, some of the function modules need parameters, which are related to the coordinates required for the robot 15 to operate or to wordings to be output to the user. In such case, the processing unit 111 adds the parameters to be used in the functional modules into the function list and transmits the parameters to the natural language processing system 50. Then, the processing unit 111 receives from the natural language processing system 50 data to identify the function module to be executed and data of a parameter applied to the identified function module. The processing unit 111 generates an action command for the robot 15 based on the identified function module and the data for the parameter applied to the identified function module. Also in this case, the natural language processing system 50 transmits, as a response, data for identifying the function module to be executed by the robot 15 and data of a parameter applied to the identified function module. Thus, the action command for the robot 15 is limited to one of the function modules and the robot 15 can appropriately work using the data for the parameter corresponding to the selected function module.

FIG. 2 is a diagram showing an example of the function list. The function module 2*a* is a function module that converts designated text into speech and cause the speaker 14 to output the speech. The function module 2*b* is a function module that causes the mobile robot 12 to move to designated coordinates (target_location). The function module 2*c* is a function module that confirms the ordered table. The function module 2*d* is a function module that performs a waiting operation. The function module 2_e_ is a function module that performs an Internet search using the search engine Bing (registered trademark). The function module 2_f_ is a function module that performs Azure (registered trademark) Cognitive Search. As described above, some function modules need to specify parameters.

(History log) The storage unit 112 further includes the input buffer 112_b_ for saving input data, and the history log storage block 112_c_ for storing a history log.

The input buffer 112_b_ firstly stores instruction data from the user that is input with the voice input unit 114. Next, the data in the input buffer 112_b_ is overwritten with a reaction from the robot 15 by the processing unit 111 each time the robot 15 reacts according to the action command generated by the processing unit 111. The reaction from the robot 15 means an action result (so-called return value) of the robot 15 having executed the action command.

The history log is log data in which data read from the input buffer 112_b_ and responses from the natural language processing system 50 that corresponds to the read data accumulate. The history log storage block 112_c_ stores sets of inputs to the natural language processing system 50 and outputs corresponding to the inputs as the history log.

Currently, the natural language processing system 50 can only return one response for one query. That is, the natural language processing system 50 can only return, to the processing unit 111, one response to one instruction from the user. Thus, the processing unit 111 can only generate one action command for the robot 15 in response to one instruction from the user. For this reason, the robot 15 cannot work continuously with a single instruction from the user.

Regarding this issue, in this embodiment, the processing unit 111 generates a prompt by adding the history log accumulated in the history log storage block 112_c_ as well as the data read from the input buffer 112_b_ to the prompt, and transmits the prompt to the natural language processing system 50 after transmitting an instruction from the user in natural language to the natural language processing system 50.

As a result, the natural language processing system 50 generates a response based on the data read from the input buffer 112_b_ and the history log, and the processing unit 111 can generate an action command based on the history log. Here, an example will be described where an instruction is provided for the first time to work the robot 15. In this case, data initially stored in the input buffer 112_b_ is an instruction from the user. At this stage, no data has been stored in the history log. Thus, the natural language processing system 50 outputs the first response to the processing unit 111 based on the instruction from the user, which is the data read from the input buffer 112_b_. As described above, the history log stores the data read from the input buffer 112_b_ and the responses from the natural language processing system 50 to the read data as a set. Thus, the history log stores the instruction from the user and the first response to the instruction. The processing unit 111 generates an action command for the robot 15 based on the first response, and the robot 15 performs an action according to the action command. Then, the data in the input buffer 112_b_ is overwritten with the action result of the robot 15 as a response. The processing unit 111 again adds the data read from the input buffer 112_b_ and the history log to a prompt and transmits the prompt to the natural language processing system 50. Then, the natural language processing system 50 outputs the next response to the processing unit 111, and the processing unit 111 generates the next action command.

As described above, the processing unit 111 can generate an action command for the robot 15 while considering the history. Once the user gives an instruction to the robot 15, the processing unit 111 keeps transmitting prompts to the natural language processing system 50 until the natural language processing system 50 determines that a task for the robot 15 has been completed, thereby enabling the robot 15 to work continuously.

FIG. 3 is a diagram showing an example of the history log. The first line shows log data indicating that the user has instructed the robot 15 (specifically, the microphone 13) to "make tea". The second line shows log data indicating that the natural language processing system 50, in response to the instruction to "make tea", has identified the function module 2_a_ from the function list, and has selected wordings of "please wait a moment" as data of parameter applied to the function module 2_a_. The log data in the first line is the input to the natural language processing system 50 and the log data in the second line is the output from the natural language processing system 50, and are added to the history log as a set. The third line shows log data indicating that the functional module 2_a_ has been executed and an action result (so-called return value) has been returned in which the speaker 14 has output speech of "please wait a moment." The fourth line shows log data indicating that a response has been received from the natural language processing system 50 when the prompt including the action result in the third line was sent to the natural language processing system 50. The (n-1)th line shows log data indicating that the function module 2_a_ has been executed and the action result (i.e., return value) is returned in which the speaker 14 outputs speech of "Here is your tea. Please enjoy your time." The nth line, which is the final line, shows log data indicating that the natural language processing system 50 transmits a response of "action completed" of the robot 15 when the prompt including the operation result on (n-1)th line was sent to the natural language processing system 50. The action of the robot 15 is completed with the answer of "action completed" from the natural language processing system 50. The two pieces of the log data on the third and fourth lines and the two pieces of the log data on the (n-1)th and nth lines are respectively input and output to/from the natural language processing system 50, and thus are added to the history log as sets. Specifically, the "action completed" refers to the completion of the flowchart described in the prerequisite area 4_b_, which will be described next.

The history log stores, as a history, sets of inputs and outputs to/from the natural language processing system 50 from the initial instruction to the robot 15, so that the natural language processing system 50 can recognize what has been executed. Specifically, the natural language processing system 50 can understand to which step in the flowchart described in the prerequisite area 4_b_, which will be described later, has been executed. Sending this data to the natural language processing system 50 enables the natural language processing system 50 to provide an appropriate response regarding the next action, with considering the history.

(Prerequisite) The storage unit 112 further includes the prerequisite storage block 112_d_ that stores prerequisites for the operation of the robot 15. The prerequisites include an operational procedure for an operation performed by the robot 15. Specifically, the operation by the robot 15 is divided into multiple steps and the operational procedure define a guideline for each step. These operational procedure are described in the Unified Modeling Language (UML).

When the operational procedure for the robot 15 described in a source code is given to the natural language processing system 50 as a prerequisite, the natural language processing system 50 follows the source code, resulting in a highly precise response but not a flexible response. On the other hand, the operational procedure as a prerequisite described in sentences using Japanese, English, or other languages, include ambiguity. Thus, a response to identify an action for the robot 15 may not be obtained from the natural language processing system 50 and action commands cannot be generated appropriately based on such response.

In this embodiment, the processing unit 111 transmits to the natural language processing system 50 a prompt including the prerequisites stored in the prerequisite storage block 112*d* and the instruction from the user in natural language.

The prerequisite includes the operational procedure for the operation to be performed by the robot 15 with the operation divided into multiple steps. Thus, the natural language processing system 50 can provide an appropriate and flexible response according to the operational procedure. Therefore, the processing unit 111 can generate, based on these responses, an action command that enables the robot 15 to work flexibly in accordance with the operational procedure.

FIGS. 4A and 4B are diagrams showing examples of prerequisites. The prerequisite described in the area 4*a* defines the purpose. For example, the area 4*a* defines that the purpose is to complete the flowchart (see "complete the flowchart" in the area 4*a*). In the area 4*b*, code data showing the flowchart to be completed is written in UML (for example, Mermaid). This flowchart corresponds to the above-described operational procedure. Since the area 4*a* describes that completing the flowchart is the goal, the natural language processing system 50 outputs a response to the user's instruction to complete this flowchart. Thereby, the natural language processing system 50 can provide an appropriate and flexible response to the processing unit 111.

Here, the advantages of UML will be described. For example, the area 4*b* describes "speak out something like 'make me some coffee' or 'give me a lot of water', or 'give me a small amount of water'." As the phrase "something like" indicates, the natural language processing system 50 does not necessarily need to determine which of the phrases "make me some coffee", "give me a lot of water" or "give me a small amount of water" is used as the parameter data. The natural language processing system 50 can determine parameter data appropriately in accordance with the purpose described in the area 4*a*. This enables the natural language processing system 50 to give flexible responses in accordance with the operational procedure described in UML.

The area 4*c* describes target location information (see Target Location Information). This is an example of information of the environment in which the robot 15 operates (i.e., the environment around the robot 15), and corresponds to parameter data relating to coordinates used for the functional module 2*b*. For example, inputting table 1 to the function module 2*b* means an action command to cause the robot to move to the table 1.

The area 4*d* describes remarks. The remarks may include various contents such as conditions and restrictions. For example, the remarks may include information about the region in which the robot 15 is used (see the area 4*d* describing "This is a relaxation area located within a factory of DENSO cooperation in Aichi prefecture", for example). Adding information about the region in which the robot 15 is used into the prerequisite information enables the natural language processing system 50 to obtain various information, such as weather information and event information, in that region by searching the Internet. This enables more flexible responses. In addition, the remarks describe "Stick to the flowchart." Such description enables the natural language processing system 50 to surely follow the operational procedure. This enables efficient outputs of appropriate responses. In addition, the remarks describe "Think step by step." Such description helps the natural language processing system 50 think step-by-step and return a response that allows the robot 15 to work appropriately without returning a response that involves leaps in logic.

Next, a specific operation of the processing unit 111 will be described with reference to FIG. 5. FIG. 5 is a flowchart for describing a processing flow of the processing unit 111.

In step S501, the processing unit 111 reads the function list stored in the function list storage block 112*a* and the prerequisites stored in the prerequisite storage block 112*d*.

In step S502, the processing unit 111 determines whether there is an input from the voice recognition unit 115, that is, whether the user inputs an instruction via the microphone 13. If there is an input from the voice recognition unit 115, the flow proceeds to step S503. If there is no input from the voice recognition unit 115, the flow returns to step S502.

In step S503, the processing unit 111 overwrites the data in the input buffer 112*b* with the input from the voice recognition unit 115.

In step S504, the processing unit 111 transmits to the natural language processing system 50 the prerequisites and the function list read out in step S501, the overwritten data in the input buffer 112*b*, and the history log accumulated in the history log storage block 112*c*. If there is no data in the history log, null data will be sent.

In step S505, the processing unit 111 adds the data in the input buffer 112*b* and the response from the natural language processing system 50 to the history log. The data added to the history log in step S505 is a set of input to the natural language processing system 50 and output from the natural language processing system 50 in response to the input.

In step S506, the processing unit 111 branches the process depending on the response from the natural language processing system 50. If the answer from the natural language processing system 50 is to cause the speaker 14 to output sound (here, speech), which corresponds to an execution of the function module 2*a* in FIG. 2, the flow proceeds to step S507. If the response from the natural language processing system 50 is to cause the mobile robot 12 to perform an action (here, to move or stand still), which corresponds to an execution of the function module 2*b* or the function module 2*d*, the flow proceeds to step S509. If the response from the natural language processing system 50 is to cause the search server 60 to perform a search, which corresponds to an execution of the function module 2*e* or the function module 2*f*, the flow proceeds to step S511. The branches at step S506 are merely examples, and the branches may include that a response from the natural language processing system 50 is to cause the processing unit 111 to confirm the ordered table, which corresponds to an execution of the function module 2*c* in FIG. 2. If the response from the natural language processing system 50 is "completed," the program is ended.

In step S507, the processing unit 111 transmits an action command (here, a speech command) generated based on the response from the natural language processing system 50 to the voice synthesis unit 117.

In step S508, the processing unit 111 overwrites the data in the input buffer 112*b* with the response from the voice synthesis unit 117 (for example, a result of speech). Thereafter, the flow returns to step S504, and the processing unit 111 transmits, to the natural language processing system 50, the function list, the prerequisites, the overwritten data in the input buffer 112*b,* and the history log. As a result, steps S504 to S510 are repeatedly executed until the natural language processing system 50 determines that the work of the robot 15 is completed based on completion of the flow, enabling the robot 15 to perform successive actions.

In step S509, the processing unit 111 transmits an action command generated based on the response from the natural language processing system 50 to the robot control unit 121.

In step S510, the processing unit 111 overwrites the data in the input buffer 112*b* with the response from the robot control unit 121 (i.e., the operation result). Thereafter, the flow returns to step S504, and the processing unit 111 transmits, to the natural language processing system 50, the function list, the prerequisites, the overwritten data in the input buffer 112*b,* and the history log. As a result, steps S504 to S510 are repeatedly executed until the natural language processing system 50 determines that the work of the robot 15 is completed based on completion of the flow, enabling the robot 15 to perform successive actions.

In step S511, the processing unit 111 transmits a search command generated based on the response from the natural language processing system 50 to the search server 60. The search server 60 performs an internet search using the search engine Bing (registered trademark) or Azure (registered trademark) Cognitive Search based on the search command.

In step S512, the processing unit 111 overwrites the data in the input buffer 112*b* with the search results from the search server 60. Thereafter, the flow returns to step S504, and the processing unit 111 transmits, to the natural language processing system 50, the function list, the prerequisites, the overwritten data in the input buffer 112*b,* and the history log. As a result, steps S504 to S510 are repeatedly executed until the natural language processing system 50 determines that the work of the robot 15 is completed based on completion of the flow, enabling the robot 15 to perform successive actions.

In addition, in FIG. 5, an example has been described in which the processing unit 111 transmits a prompt including the data in the input buffer, the function list, the history log, and the prerequisites to the natural language processing system 50. However, the processing unit 111 may transmit a prompt including the data from the input buffer 112*b* and at least one of the function list, the history log, or the prerequisites to the natural language processing system 50.

For example, if the prompt includes all of data in the input buffer, the function list, the history log, and the prerequisites, the processing unit 111 can cause the robot 15 to: work appropriately and flexibly using the prerequisites that define the operational procedure; act successively considering the past actions by looping the processing using the history log; and act as intended using the function list. Using the function list also allows the natural language processing system 50 to return a response identifying one of the function modules to be executed. That is, the response indicates data to identify the predetermined function module, so that the response can be accumulated as a history log in a form that can be used later. This allows the prompt to include the history log, which further resulting in the appropriate next response.

Figure 6:
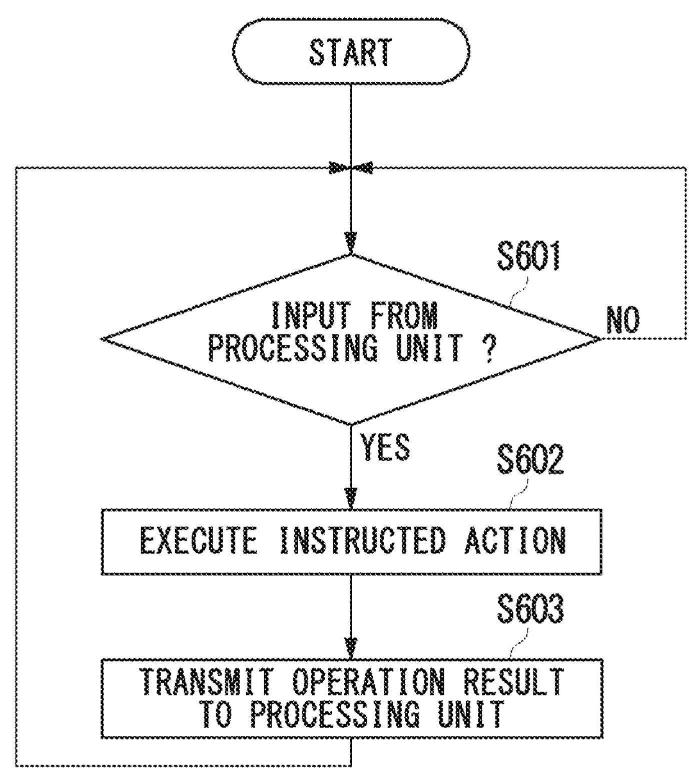
FIG. 6 is a flowchart illustrating a process of a robot controller.

Next, a specific operation of the robot control unit 121 will be described with reference to FIG. 6. FIG. 6 is a flowchart illustrating a process of the robot control unit 121.

In step S601, the robot control unit 121 determines whether there is an input from the processing unit 111. If there is an input from the processing unit 111, that is, there is an action command for the mobile robot 12, the flow proceeds to step S602. If there is no input from the processing unit 111, the flow returns to step S601.

In step S602, the robot control unit 121 executes an action as instructed in the action command.

In step S603, the robot control unit 121 transmits the action result to the processing unit 111.

(Other embodiments) Although the embodiment of the present disclosure has been described above, the present disclosure should not be understood as being limited to the above-described embodiment, and can be applied to various embodiments and combinations without departing from the gist of the present disclosure.

Further, the process flow described in the above embodiment is only an example. Unnecessary steps may be deleted, new steps may be added, or the processing order may be changed without departing from the scope of the present disclosure.

In the above embodiment, instructions are given to the robot 15 via the microphone 13. However, instructions may be given to the robot 15 not only by voice via the microphone 13, but also by text information via a keyboard or a touch panel. Also, a display may be used instead of the speaker 14 to provide text information to the user.

The invention claimed is:

1. A controller for controlling a robot based on an interaction with a user, the controller comprising:
- an input unit configured to receive, from the user, an instruction for the robot, the input unit including at least one of a microphone, a keyboard, or a touch panel;
- an output unit configured to output, to the user, a reaction from the robot to the instruction, the output unit including at least one of a speaker or a display;
- a memory including an input buffer configured to save data of the instruction input from the input unit, and a history log storage unit configured to store a history log; and
- a processor configured to:
  - generate a prompt to inquire about a next action of the robot;
  - transmit the prompt to a natural language processing system using a large language model;
  - receive a response from the natural language processing system;
  - generate an action command for the robot based on the response; transmit the action command to the robot to cause the robot to physically perform the next action;
  - receive an action result of the next action from the robot;
  - overwrite the data in the input buffer with the action result;
  - accumulate, in the history log, the data read from the input buffer and the response from the natural language processing system to the data; and
  - generate a subsequent prompt including the action result read from the input buffer and the history log.

2. The controller according to claim 1, wherein
- an operation performed by the robot is divided into a plurality of steps;
- an operational procedure is defined for the plurality of steps:
- the memory includes a prerequisite storage unit storing a prerequisite including the operational procedure; and
- the processor processing unit is further configured to:

transmit, to the natural language processing system, the prompt including the prerequisite, the data read from the input buffer, and the history log;

receive the response from the natural language processing system; and generate the action command based on the response.

3. The controller according to claim 2, wherein the operational procedure is described in Unified Modeling Language.

4. A robot system comprising:

the controller according to claim 1; and the robot.

5. A system comprising:

the controller according to claim 1;

the robot; and the natural language processing system.

6. A control method for controlling a robot based on an instruction with a user, the control method comprising:

receiving, from the user, an instruction for the robot;

outputting, to the user, a reaction from the robot to the instruction;

saving data of the instruction in an input buffer;

storing a history log in a memory;

generating a prompt to inquire about a next action of the robot;

transmitting the prompt to a natural language processing system using a large language model;

receiving a response from the natural language processing system;

accumulating, in the history log, the data read from the input buffer and the response from the natural language processing system to the data;

generating an action command for the robot based on the response;

transmitting the action command to the robot to cause the robot to physically perform the next action;

receiving an action result of the next action from the robot;

overwriting the data in the input buffer with the action result; and generating a subsequent prompt including the action result read from the input buffer and the history log.

7. A non-transitory computer-readable storage medium comprising a control program configured to control a robot based on an interaction with a user, the control program being configured to, when executed by a computer, cause the computer to:

receive, from the user, an instruction for the robot;

output, to the user, a reaction from the robot to the instruction;

save data of the instruction in an input buffer;

store a history log in a memory;

generate a prompt to inquire about a next action of the robot;

transmit the prompt to a natural language processing system using a large language model;

receive a response from the natural language processing system;

accumulate, in the history log, the data read from the input buffer and the response from the natural language processing system to the data;

generate an action command for the robot based on the response;

transmit the action command to the robot to cause the robot to physically perform the next action;

receive an action result of the next action from the robot;

overwrite the data in the input buffer with the action result; and generate a subsequent prompt including the action result read from the input buffer and the history log.

8. The controller according to claim 1, wherein the memory includes a function list storage block configured to store a function list including function modules each defining a predetermined action performed by the robot, each function module being associated with an identifier, and at least one of the function modules being associated with one or more parameters;

the processor is further configured to read the function list from the memory;

the prompt and the subsequent prompt include the function list;

the response from the natural language processing system indicates the identifier of one of the function modules and, when the function module identified by the identifier is associated with one or more parameters, parameter data corresponding to the one or more parameters; and the action command is configured to cause the robot to execute the function module identified by the identifier using the parameter data when the response indicates the parameter data.

9. The controller according to claim 1, wherein the processor is further configured to repeatedly generate and transmit subsequent prompts to the natural language processing system until a response from the natural language processing system indicates completion of the instruction.

* * * * *